US012512571B2

(12) United States Patent
Mung

(10) Patent No.: US 12,512,571 B2
(45) Date of Patent: Dec. 30, 2025

(54) MICROSTRIP PHASE INVERTER INCLUDING FIRST AND SECOND STRIP LINES CONNECTED BY VIAS TO AN INSERT CONDUCTOR LAYER

(71) Applicant: The Education University of Hong Kong, Hong Kong (HK)

(72) Inventor: Wai Yin Mung, Hong Kong (HK)

(73) Assignee: The Education University of Hong Kong, Hong Kong (HK)

(*) Notice: Subject to any disclaimer, the term of this patent is extended or adjusted under 35 U.S.C. 154(b) by 145 days.

(21) Appl. No.: 18/518,627

(22) Filed: Nov. 24, 2023

(65) Prior Publication Data

US 2025/0174863 A1 May 29, 2025

(51) Int. Cl.
*H01P 1/18* (2006.01)
*H01P 3/08* (2006.01)

(52) U.S. Cl.
CPC ................ *H01P 1/184* (2013.01); *H01P 3/08* (2013.01)

(58) Field of Classification Search
CPC ........................................ H01P 1/184
USPC ........................................ 333/161
See application file for complete search history.

(56) References Cited

U.S. PATENT DOCUMENTS 9,343,796 B2 * 5/2016 Yang et al. ............. H01P 1/203
2013/0265120 A1 * 10/2013 Park et al. .............. H01P 1/184
333/161

* cited by examiner

*Primary Examiner* — Benny T Lee
(74) *Attorney, Agent, or Firm* — IDEA Intellectual Limited; Sam T. Yip

(57) ABSTRACT

A microstrip phase inverter includes a bottom layer, a first dielectric layer, an insert conductor (IC) layer, a second dielectric layer, a top layer, at least one first via, and a pair of second vias. The first dielectric layer is disposed over the bottom layer. The IC layer is disposed over the first dielectric layer. The second dielectric layer is disposed over the IC layer. The top layer is disposed over the second dielectric layer and includes a first strip line and a second strip line which extend along a first direction and across at least one edge of the IC layer and are narrower than the IC layer along a second direction different than the first direction. The first via electrically connects the bottom layer to the IC layer. The second vias electrically connect the IC layer to the first strip line and the second strip line, respectively.

20 Claims, 12 Drawing Sheets

MICROSTRIP PHASE INVERTER INCLUDING FIRST AND SECOND STRIP LINES CONNECTED BY VIAS TO AN INSERT CONDUCTOR LAYER

TECHNICAL FIELD

The present invention generally relates to microstrip phase inverters in microwave circuit designs, which are used in high-power devices.

BACKGROUND

The microstrip phase inverter provides a 1800 phase shift by reversing both the signal and the ground line. Various types of phase inverters, integrated into structures such as microstrips, coplanar waveguides, asymmetrical coplanar strips, and parallel strip lines (PSL), have played a pivotal role in reducing the size of microwave components, including rat-race hybrids, filters, and power dividers.

Despite their versatility, current phase inverters face limitations in high-power applications in which significant heat is generated by the high-power amplifiers. Traditionally, the underside of a microwave component requires a large metal ground plane for mounting on the heat sink alongside the high-power amplifier. When the circuit is fabricated in monolithic microwave integrated circuit (MMIC), the underside of the die is also the metal ground plane. However, in conventional microstrip phase inverter designs, there are often circuit portions on the bottom side, especially in the transition from the microstrip line to other transmission line structures. This configuration presents challenges when grounded on the heat sink, notably impacting the S-parameters.

Therefore, there is a pressing need for a microstrip phase inverter specifically tailored to address the limitations and challenges posed by high-power applications.

SUMMARY OF INVENTION

It is an objective of the present invention to provide an apparatus and a circuit design to address the aforementioned shortcomings and unmet needs in the state of the art.

In accordance with one aspect of the present invention, provided is a microstrip phase inverter that includes a bottom layer, a first dielectric layer, an insert conductor (IC) layer, a second dielectric layer, a top layer, at least one first via, and a pair of second vias. The first dielectric layer is disposed over the bottom layer. The IC layer is disposed over the first dielectric layer. The second dielectric layer is disposed over the IC layer. The top layer is disposed over the second dielectric layer and includes a first strip line and a second strip line which extend along a first direction and across at least one edge of the IC layer and are narrower than the IC layer along a second direction different than the first direction. The first via electrically connects the bottom layer to the IC layer. The second vias electrically connect the IC layer to the first strip line and the second strip line, respectively.

In accordance with another aspect of the present invention, provided is an microstrip phase inverter that includes a bottom layer, an insert conductor (IC) layer, and a top layer. The bottom layer has a top border and a bottom border opposite the top border which extend along a first direction. The IC layer is located between the top and bottom borders of the bottom layer in viewing along a normal direction of the bottom layer, in which the IC layer has a top border and a bottom border opposite the top border which extend along the first direction and a left border and a right border opposite the left border which extend along a second direction different than the first direction. The top layer is located between the top and bottom borders of the IC layer and has a first strip line pattern and a second strip line pattern which are separated than each other. The first strip line pattern extends along the first direction and across the left border of the IC layer, and the second strip line pattern extends along the first direction and across the right border of the IC layer, such that the first strip line pattern and the second strip line pattern span from inside to outside of the IC layer.

By the above configuration, the microstrip phase inverter of the present invention can achieve certain amount of size reduction, preventing subsequent component integration stages from becoming excessively large; and the microstrip phase inverter of the present invention features a complete ground plane without any circuit on the bottom side so it is easy to connect with other microstrip components by placing on heat sink in high-power application and integrated in MMIC. As such, the microstrip phase inverter of the present invention presents a topology that is available to be incorporated into monolithic microwave integrated circuits (MMICs).

BRIEF DESCRIPTION OF DRAWINGS

Embodiments of the invention are described in more details hereinafter with reference to the drawings, where like features are denoted by the same reference a label throughout the detail description of the drawings, in which.

DETAILED DESCRIPTION OF THE INVENTION

In the following description, microstrip phase inverters and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1A:
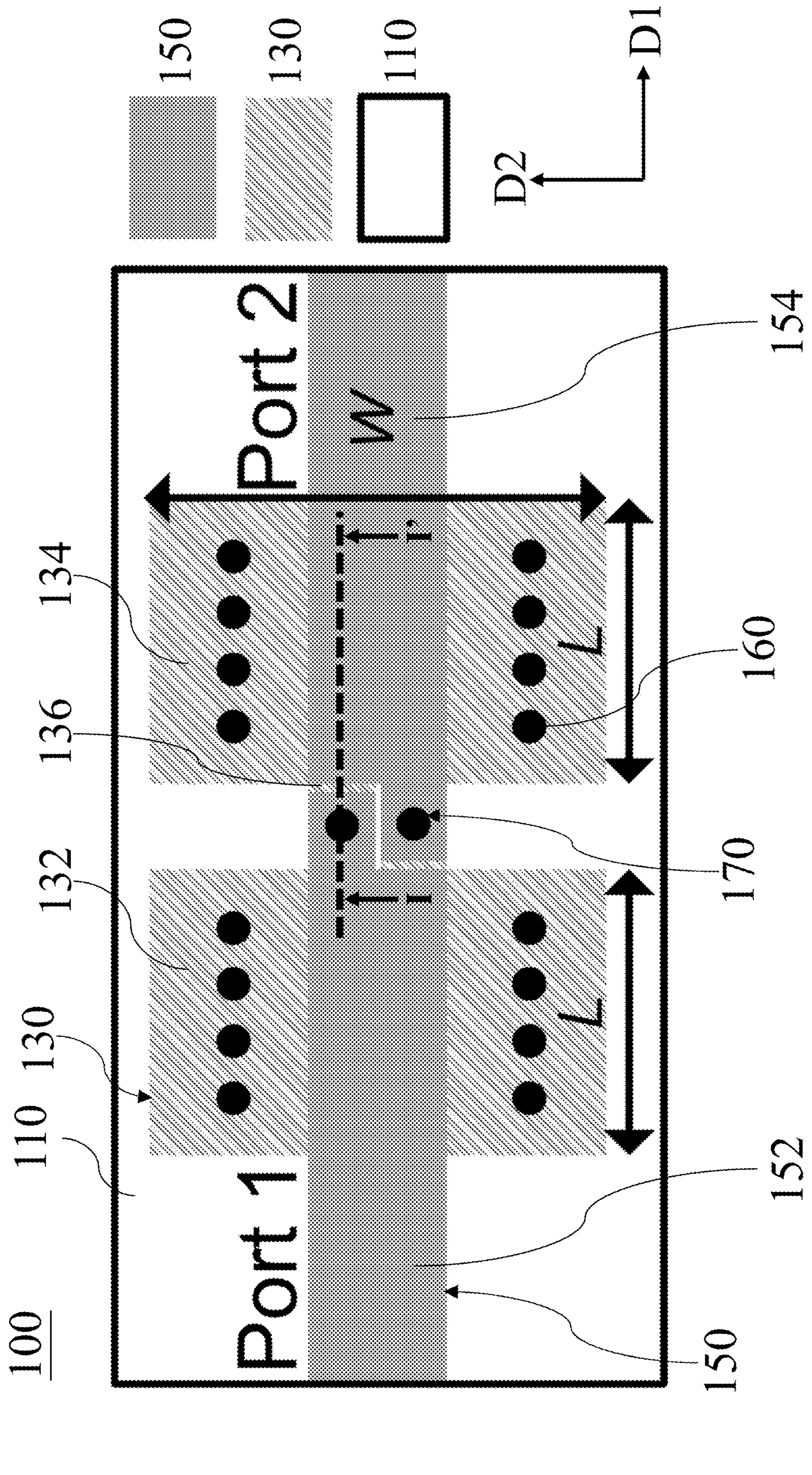
FIG. 1A is a schematic diagram of a top view of a microstrip phase inverter according to an embodiment of the present invention.
Figure 1B:
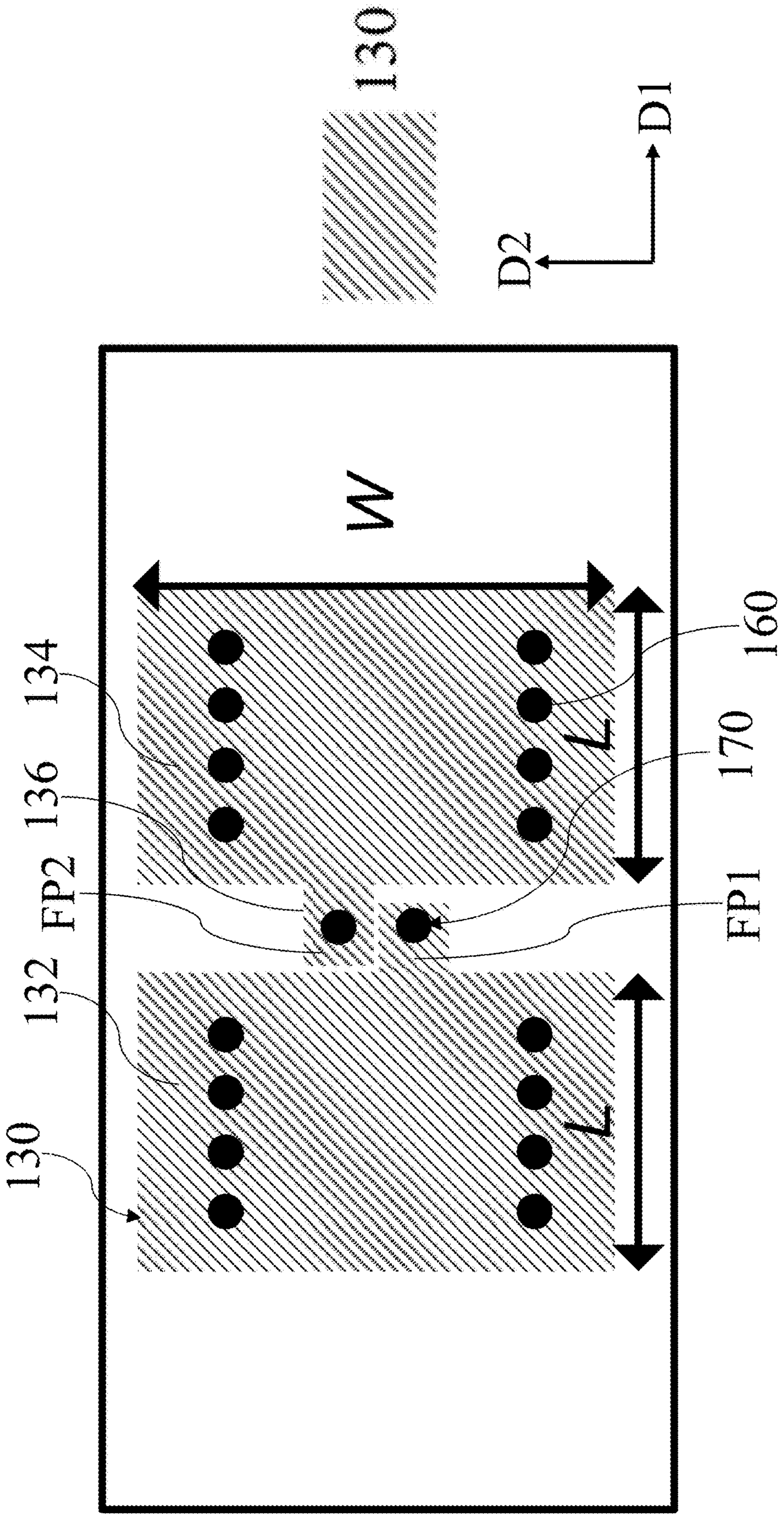
FIG. 1B is a schematic diagram of a top view of an insert conductor layer of a microstrip phase inverter of FIG. 1A according to an embodiment of the present invention.
Figure 2:
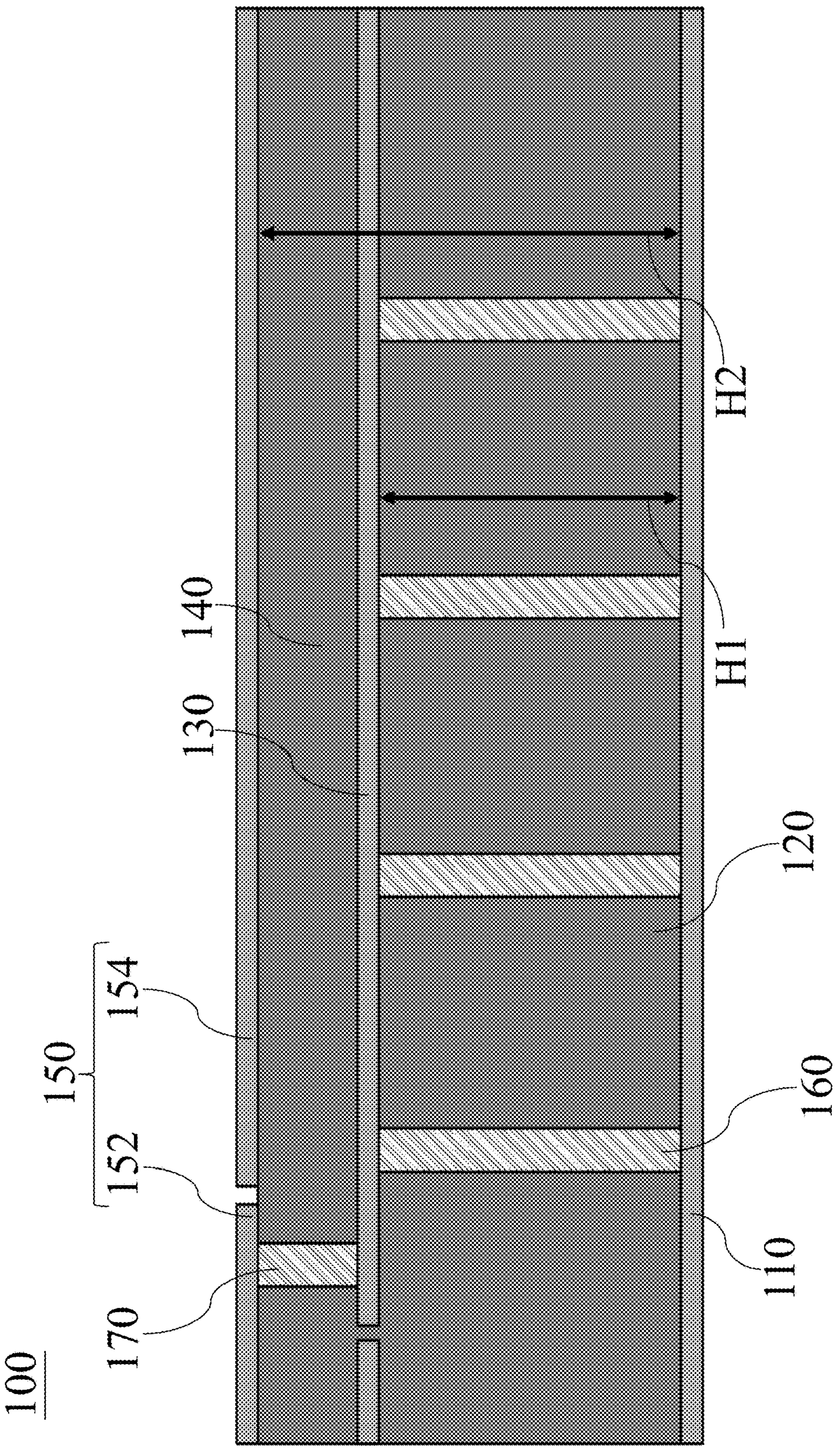
FIG. 2 is a schematic diagram of a cross-sectional view of the microstrip phase inverter at line I-I' of FIG. 1 according to an embodiment of the present invention.

Referring to FIG. 1A, FIG. 1B, and FIG. 2 for the following description, in which the cross-section view of FIG. 2 corresponds to line I-I' of FIG. 1A. For convenience of explanation, a first direction D1 and a second direction D2 are labeled in the drawings, which are different than each other. For example, the first direction D1 is a horizontal direction and the second direction is a vertical direction. A phase inverter applies multiple layers in combination with microstrips to form a microstrip phase inverter 100, including a bottom layer 110, a first dielectric layer 120, an insert conductor (IC) layer 130, a second dielectric layer 140, a top layer 150, at least one first via 160, and a pair of second vias 170.

The bottom layer 110 can serve as a ground plane for the microstrip phase inverter 100. In an embodiment, the bottom layer 110 is conductive, such as a metal layer or an alloy layer.

The first dielectric layer 120 is disposed over the bottom layer 110. In an embodiment, the first dielectric layer 120 includes at least one dielectric material with a dielectric constant in a range from 4 to 4.5, such as silicon oxide, oxides, silicon nitride, nitrides, or combinations thereof. In an embodiment, the first dielectric layer 120 is a multi-layered structure, such as a composite dielectric layer. It is noted that the dielectric constant is not limited but flexible; in an embodiment, the dielectric constant is in a range from 2 to 10.

The IC layer 130 is disposed over the first dielectric layer 120. In an embodiment, the IC layer 130 is a conductive layer, such as a metal layer or an alloy layer. In the top viewing as FIG. 1A and FIG. 1B, the IC layer 130 includes a first rectangle portion 132, a second rectangle portion 134, and a neck portion 136 located between the first rectangle portion and the second rectangle portion, in which the first rectangle portion 132, the neck portion 136, and the second rectangle portion 134 are arranged along the first direction D1 in sequence. The neck portion 136 has a first pattern FP1 connected to the first rectangle portion 132 and a second pattern FP2 connected to the second rectangle portion 134, which are separated than each other and arranged along the second direction. In one embodiment, each of the first pattern FP1 and the second pattern FP2 is rectangular. In an embodiment, the IC layer 130 is divided into two sub layers horizontally spaced apart from each other, in which one is composed of the first rectangle portion 132 and the first pattern FP1 of the neck portion 136 and another one is composed of the second rectangle portion 134 and the second pattern FP2 of the neck portion 136. The first rectangle portion 132 and the second rectangle portion 134 may be symmetrical about the neck portion 136. For example, in an embodiment, the distance from the first rectangle portion 132 to the second pattern FP2 of the neck portion 136 is substantially equal to the distance from the second rectangle portion 134 to the first pattern FP1 of the neck portion 136. In an embodiment, each of the first rectangle portion 132 and the second rectangle portion 134 has a length L along the first direction D1 in a range from 7 mm to 13 mm and has a width W along the first direction D1 in a range from 7 mm to 9 mm. Such the dimension configuration is made for permitting the microstrip phase inverter 100 to operate in the desired or suitable operating frequency. It is noted that the length L or width W mentioned herein is specific to/designed for a particular operating frequency, but its dimension is not strictly limited. In practical cases, the dimension may vary, depending on the substrate and operating frequency, so as to make it flexible.

The second dielectric layer 140 is disposed over the IC layer 130 and is thinner than the first dielectric layer 120. In an embodiment, the second dielectric layer 140 includes at least one dielectric material with a dielectric constant in a range from 4 to 4.5, such as silicon oxide, oxides, silicon nitride, nitrides, or combinations thereof. In an embodiment, the second dielectric layer 140 is a multi-layered structure, such as a composite dielectric layer. It is noted that the dielectric constant is not limited but flexible; in an embodiment, the dielectric constant is in a range from 2 to 10.

The top layer 150 is disposed over the second dielectric layer 140 and includes a first strip line 152 and a second strip line 154 which are spaced apart and extend along the first direction D1. In an embodiment, for forming the phase inverter, the IC layer 130 is about 0.2 mm below the top layer 150. More specifically, for example, the IC layer 130 is at a first height H1 with respect to the bottom layer 110, and the top layer 150 is at a second height H2 with respect to the bottom layer 110, in which a difference between the first height H1 and the second height H2 is between 0.1 mm and 0.3 mm.

The relationship, such as position, location, profile, between the IC layer 130 and the top layer 150, which serves as features for the layout thereof, is relative to the operation performance for the microstrip phase inverter 100; that is, those features can define the operation frequency and the S-parameter for the desired purpose.

The first strip line 152 and the second strip line 154 can extend across opposite edges of the IC layer 130 and are narrower than the IC layer 130 along the second direction. More specifically, the first strip line 152 spans across the first rectangle portion 132, extending from a position directly above the neck portion 136 to a position without vertical overlap with the first rectangle portion 132. The first strip line 152 can span across two opposite sides of the first rectangle portion 132. Similarly, the second strip line 154 spans across the second rectangle portion 134, extending from a position directly above the neck portion 136 to a position without vertical overlap with the second rectangle portion 134. The second strip line 154 can span across two opposite sides of the second rectangle portion 134. As such, a vertical projection of the first strip line 152 on the IC layer 130 overlaps with the first rectangle portion 132 and the neck portion 136 (e.g., the second pattern FP2 of the neck portion 136), and a vertical projection of the second strip line 154 on the IC layer 130 overlaps with the second rectangle portion 134 and the neck portion 136 (e.g., the first pattern FP1 of the neck portion 136). The first strip line 152 and the second strip line 154 are spaced apart from each other by a gap directly and vertically located above the neck portion 136 of the IC layer 130. The first strip line 152 is free from vertically overlapping with the second rectangle portion 134, and the second strip line 154 is free from vertically overlapping with the first rectangle portion 132. In one embodiment, the first strip line 152 has an end portion with a length along the second direction that is substantially equal to a length of the second pattern FP2 of the neck portion 136 along the second direction. In one embodiment, the second strip line 154 has an end portion with a length along the second direction that is substantially equal to a length of the first pattern FP1 of the neck portion 136 along the second direction.

The first via 160 electrically connects the bottom layer 110 to the IC layer 130. The second vias 170 electrically connect the IC layer 130 to the first strip line 152 and the second strip line 154, respectively. Specifically, one of the second vias 170 landing on the first pattern FP1 of the neck portion 136 can electrically connect the first pattern FP1 of the neck portion 136 to the first rectangle portion 132; and another one of the second vias 170 landing on the second pattern FP2 of the neck portion 136 can electrically connect the second pattern FP2 of the neck portion 136 to the second rectangle portion 132. In an embodiment, the formed microstrip phase inverter 100 has a thickness from the bottom layer 110 to the top layer 150 in a range from 1.1 mm to 1.3 mm, which is suitable for integration into a circuit design without affecting circuit size. It should be noted that the thickness is not rigidly constrained but rather flexible; it can vary to accommodate other dimension.

In the top viewing for layout design as FIGS. 1A and 1B, the layout design has features as follows. The microstrip phase inverter 100 can be formed through a series of photolithography processes using such a layout design. In this regard, the features of the layout design can be viewed along a normal direction of the bottom layer 110. The bottom layer 110 has a top border and a bottom border opposite the top border which extend along the first direction D1. The IC layer 130 is located between the top and bottom borders of the bottom layer 110. The IC layer 130 has a top border and a bottom border opposite the top border which extend along the first direction and a left border and a right border opposite the left border which extend along the second direction D2. The top layer 150 is located between the top and bottom borders of the IC layer 130. The first strip line 152 and the second strip line 154 of the top layer 150 serve as a first strip line pattern and a second strip line pattern, respectively, in the layout design, which are separated than each other. The first strip line pattern extends along the first direction D1 and across the left border of the IC layer 130, and the second strip line pattern extends along the first direction D1 and across the right border of the IC layer 130, such that the first strip line pattern and the second strip line pattern span from inside to outside of the IC layer 130.

Figure 3:
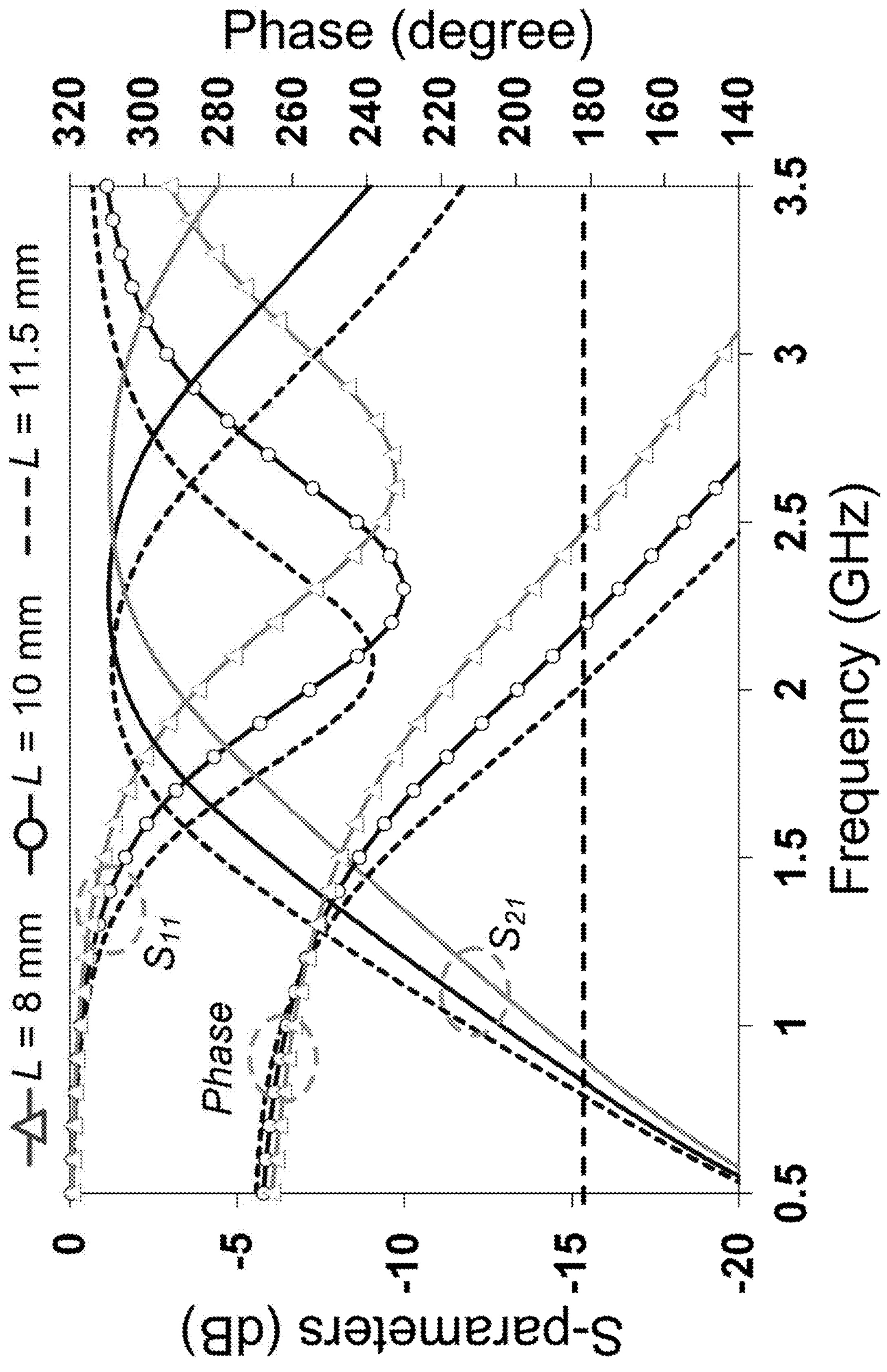
FIG. 3 depicts simulated results for a microstrip phase inverter according to an embodiment of the present invention.

Simulation and experimental results are conducted as example as follows to prove the structure of the present invention that is workable. As the parameters for W and L, with a width (W) of 8 mm and different lengths (L) of 8, 10, and 11.5 mm, frequencies ranging from 0.5 GHz to 3.5 GHz are applied to the simulation. FIG. 3 illustrates simulate S-parameter in dB results of the microstrip phase inverter with different lengths L of 8 mm, 10 mm, and 11.5 mm. The graph plots frequency response and demonstrates that a longer length shifts the operating frequency to a lower band (i.e., with a longer L, the operating frequency of the microstrip phase inverter moves to a lower frequency).

Figure 4:
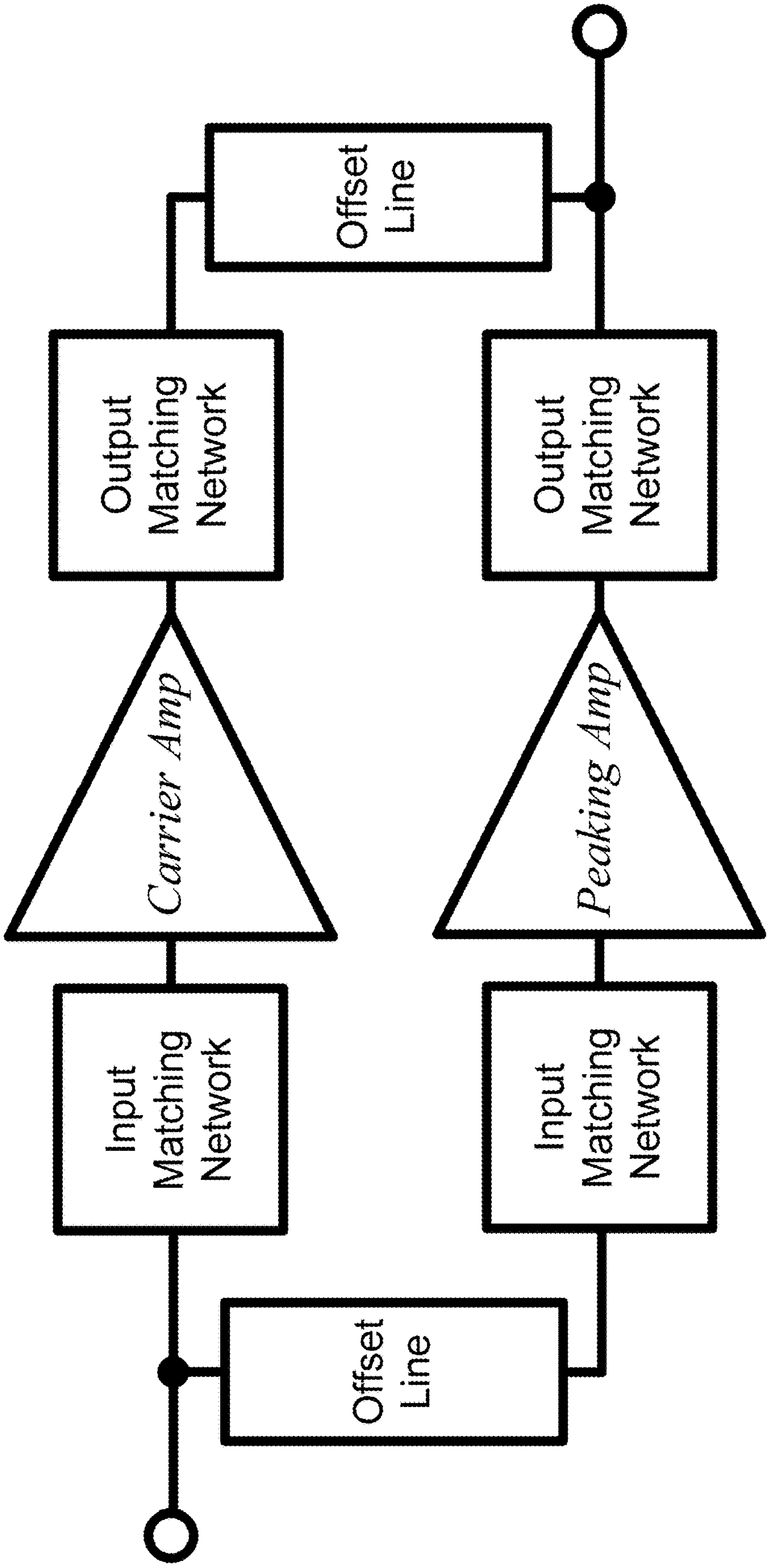
FIG. 4 depicts a circuit diagram of Doherty power amplifier (PA) that is available for integration with a microstrip phase inverter according to an embodiment of the present invention.

FIG. 4 depicts a circuit diagram of Doherty power amplifier (PA) that is available for integration with a microstrip phase inverter according to an embodiment of the present invention. In an embodiment, the microstrip phase inverter of the present invention can be implemented in offset lines at the input of the peaking amplifier and output of carrier amplifier, as shown in FIG. 4, to realize a Doherty differential power amplifier (DPA) without affecting the circuit size or heat dissipation, which can provide another differential technique to become a push-pull PA. The Doherty PA is commonly used in high-power application because it offers peak efficiency at 6 dB power back-off (PBO) point.

In this regard, the DPAs take the mainstream architecture of a mobile PA/base station PA because of the cancelling even-order harmonic terms that can improve the efficiency. Apart from cancelling even-order harmonic terms in DPAs, the common emitter of transistors used eliminates the inductance from the emitter to the backside vias, which contributes significantly to power loss at high frequencies. This improves both the gain and efficiency of the DPA, which is important to the lack of gain at high frequencies in the transmitter. Therefore, the differential input divider and output combiner are important to the DPA design. The microstrip phase inverter of the present invention can be implemented in the divider and combiner to reduce their circuit size; however, those existed phase invertors cannot achieve as such since there may be a circuit such as transition of transmission lines therein.

Figure 5:
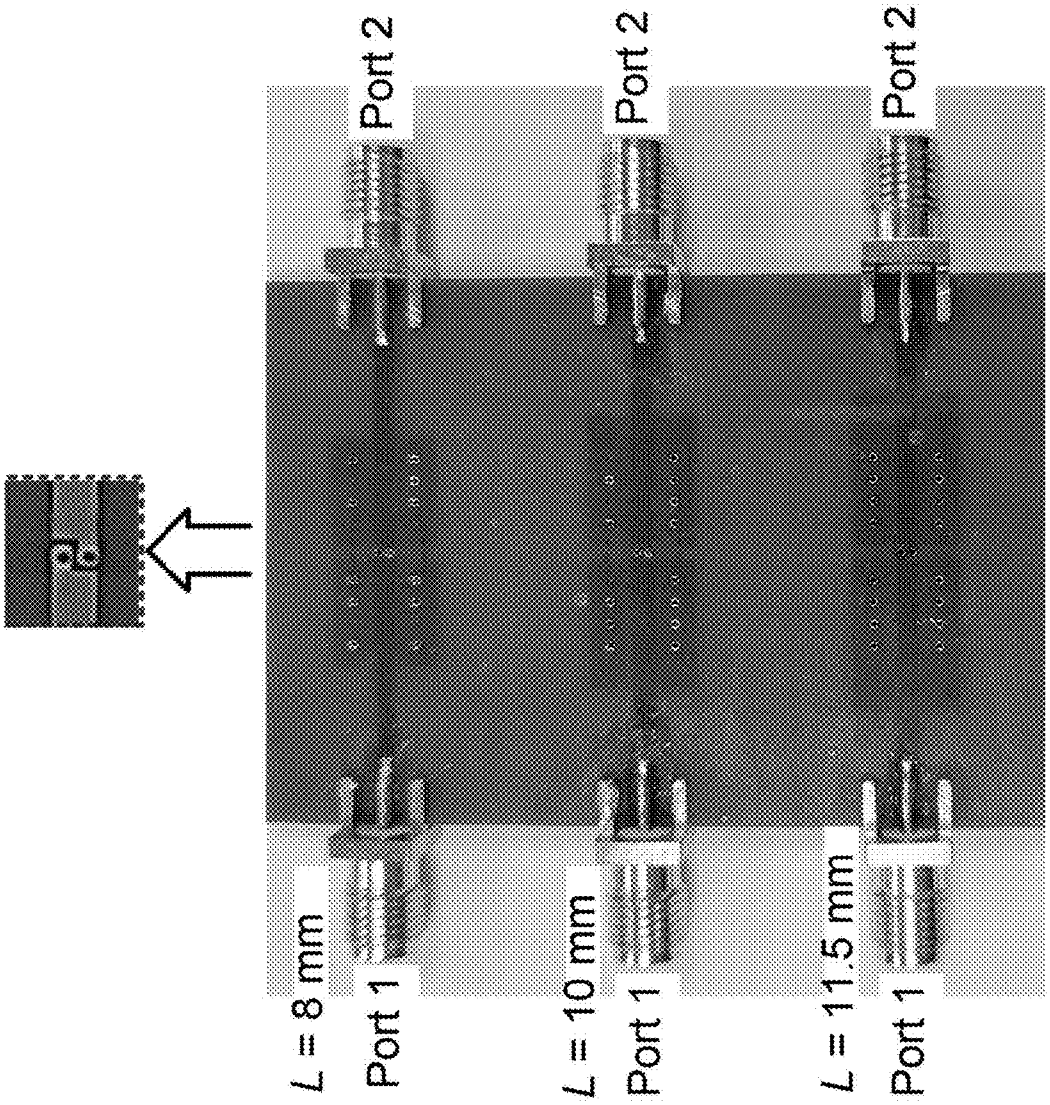
FIG. 5 is an exemplary diagram of a fabricated microstrip phase inverter according to an embodiment of the present invention.
Figure 6:
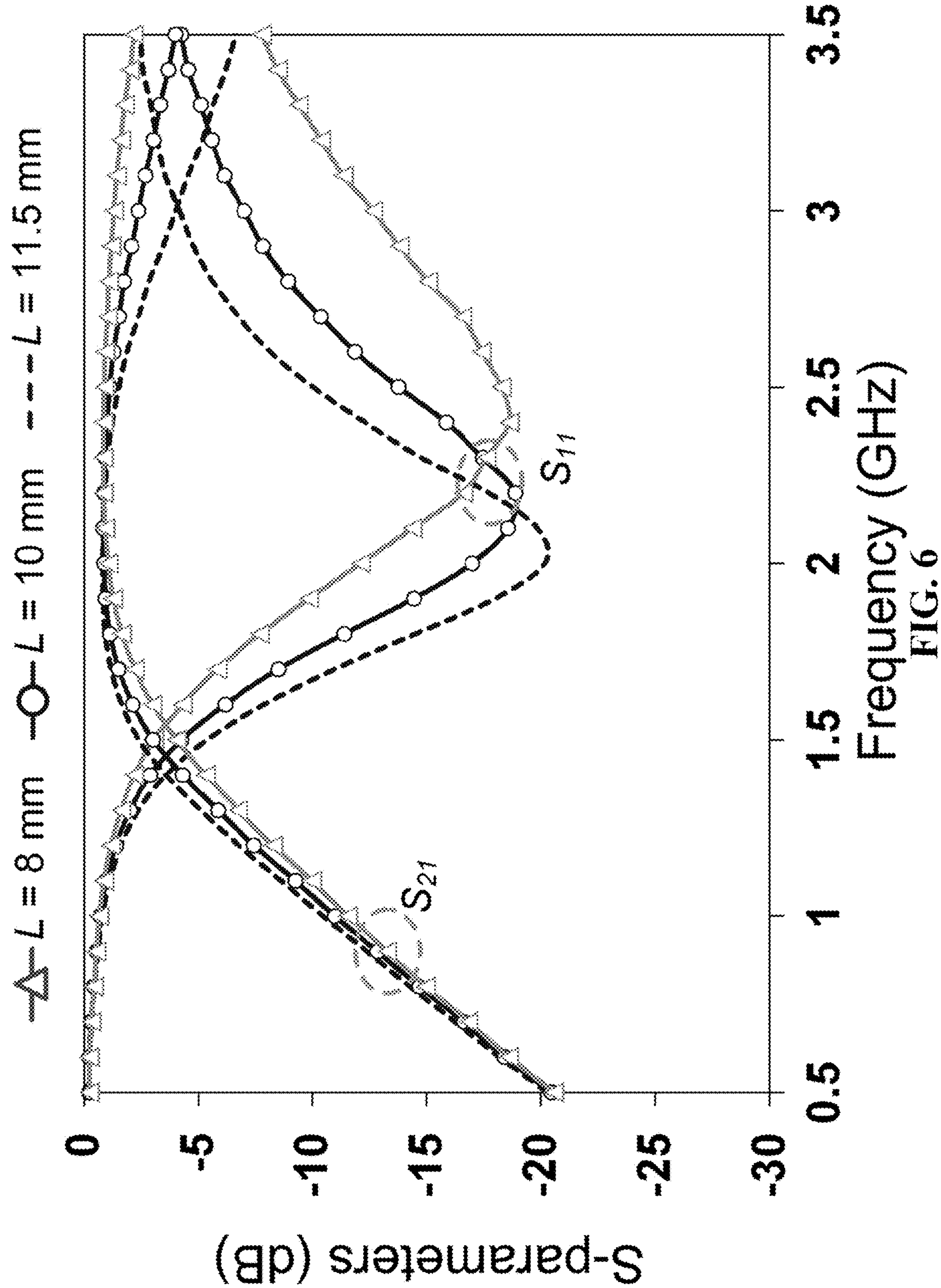
FIG. 6 depicts an exemplary graph showing S-parameters of the fabricated microstrip phase inverter from FIG. 5 according to an embodiment of the present invention.
Figure 7:
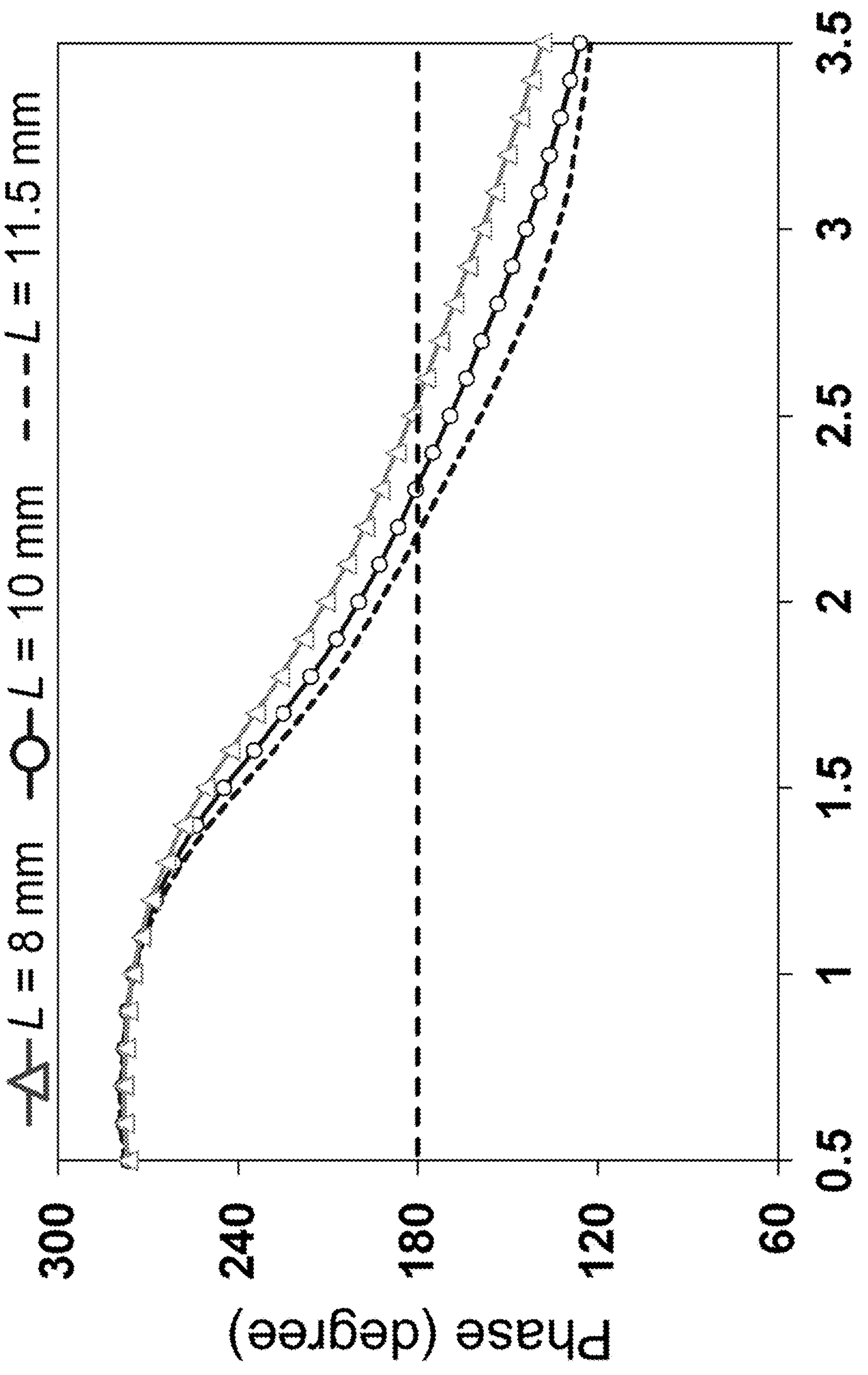
FIG. 7 depicts an exemplary graph showing phase response of the fabricated microstrip phase inverter from FIG. 5 according to an embodiment of the present invention.

FIG. 5 is an exemplary diagram of a fabricated microstrip phase inverter according to an embodiment of the present invention, in which the strip line length L is set to 8 mm, 10 mm, and 11.5 mm, respectively. Further, the microstrip phase inverter 100 of FIG. 1A can be fabricated with two ports (e.g., port 1 and port 2), as shown in FIG. 5, which means "Port 1" and "Port 2" labeled in FIG. 1A can be designated as input and output terminals for the microstrip phase inverter 100. In in dB a this regard, FIG. 6 presents measured S-parameter in dB results of the fabricated microstrip phase inverter of FIG. 5 according to an embodiment of the present invention, demonstrating the return loss ($S_{11}$) and isolation ($S_{21}$) performance within the operating frequency band in GHz; and FIG. 7 presents measured phase in degree response results of the fabricated microstrip phase inverter of FIG. 5 according to an embodiment of the present invention, showing the achieved 180° phase inversion over the intended frequency range. The fabricated microstrip phase inverter is able to achieve objective performance in an operating frequency range, as shown in FIG. 6 and FIG. 7. The operating frequency range for phase inversion is approximately in a range from about 2 GHz to about 2.5 GHz.

Phase inverters play a crucial role in reducing the size of microwave components. However, as the issues as afore-described, some phase inverters face limitations in high-power applications. The microstrip phase inverter of the present invention addresses these limitations and offers two significant advantages for high-power applications.

(1) The microstrip phase inverter of the present invention achieves size reduction, preventing subsequent component integration stages from becoming excessively large.

(2) The microstrip phase inverter of the present invention features a complete ground plane without any circuit on the bottom side, making the proposed microstrip phase inverter a pure microstrip structure. This design facilitates easy connection with other microstrip components and allows for placement on a heat sink in high-power applications, distinguishing it from other phase inverters that have circuits on their bottom sides.

The microstrip phase inverter of the present invention can be applied to passive components for size reduction and use in high-power applications and MMICs. For example, it is applicable to integrate the microstrip phase inverter into high-power power amplifiers.

Figure 8:
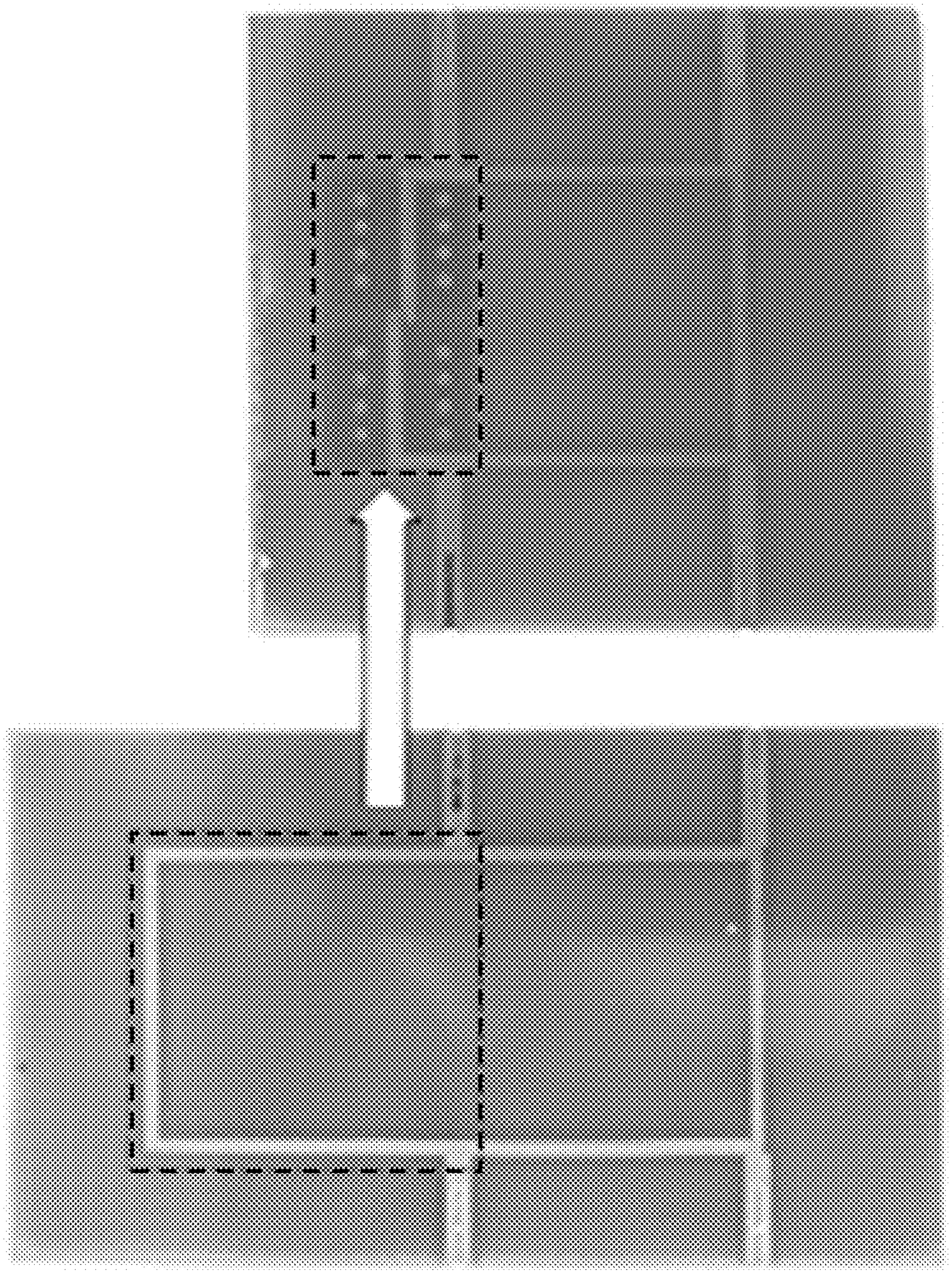
(PRIOR ART) FIG. 8
FIG. 8 which shows a comparison diagram between a conventional rat-race hybrid at the left and a rat-race hybrid with a microstrip inverter according an embodiment of the present invention at the right.

FIG. 8 illustrates a comparison between a conventional rat-race hybrid (left) and a rat-race hybrid incorporating the microstrip phase inverter according an embodiment of the present invention (right). Another example for the microstrip phase inverter is provided with accompanying FIG. 8. In this regard, rat-race hybrid is an important passive component used in balance mixers, push-pull amplifiers, antennas, etc. The rat-race hybrid, enhanced with the microstrip inverter as at least one afore-mentioned embodiment above with the 90° line (the dashed line on the right) can effectively replace the conventional 270° line of the conventional rat-race hybrid (dashed line on the left), thereby broadening the hybrid's bandwidth and reducing its overall size. As a result, the rat-race hybrid incorporating the microstrip inverter from the present invention can achieve a size reduction of over 40% compared to the conventional rat-race hybrid.

Figure 9:
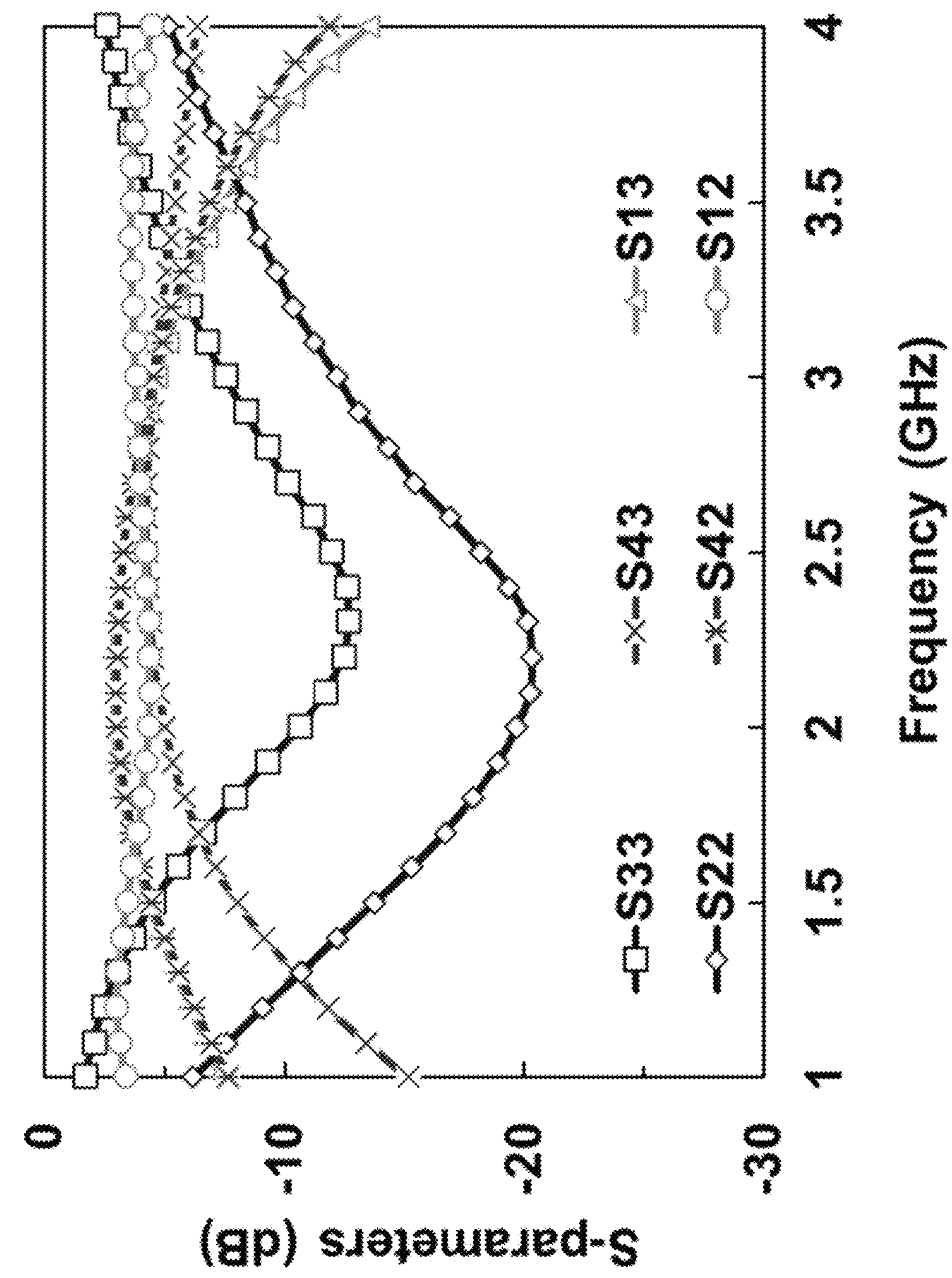
FIG. 9 depicts an exemplary graph showing measured results with the ports 2 and 3 excitations using the rat-race hybrid enhanced with the microstrip inverter according to an embodiment of the present invention.
Figure 10:
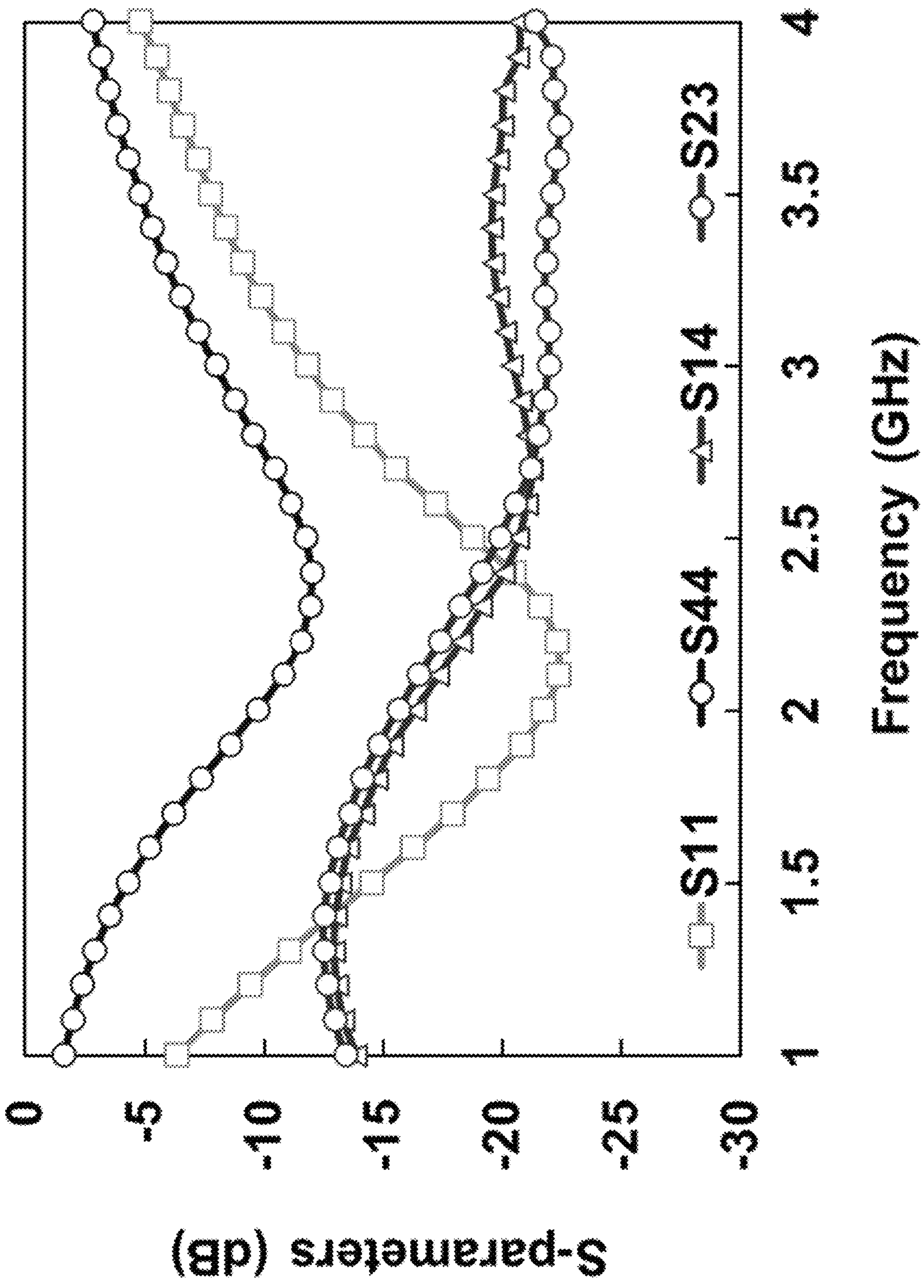
FIG. 10 depicts an exemplary graph showing measured results of return loss and isolation using the rat-race hybrid enhanced with the microstrip inverter according to an embodiment of the present invention.
Figure 11:
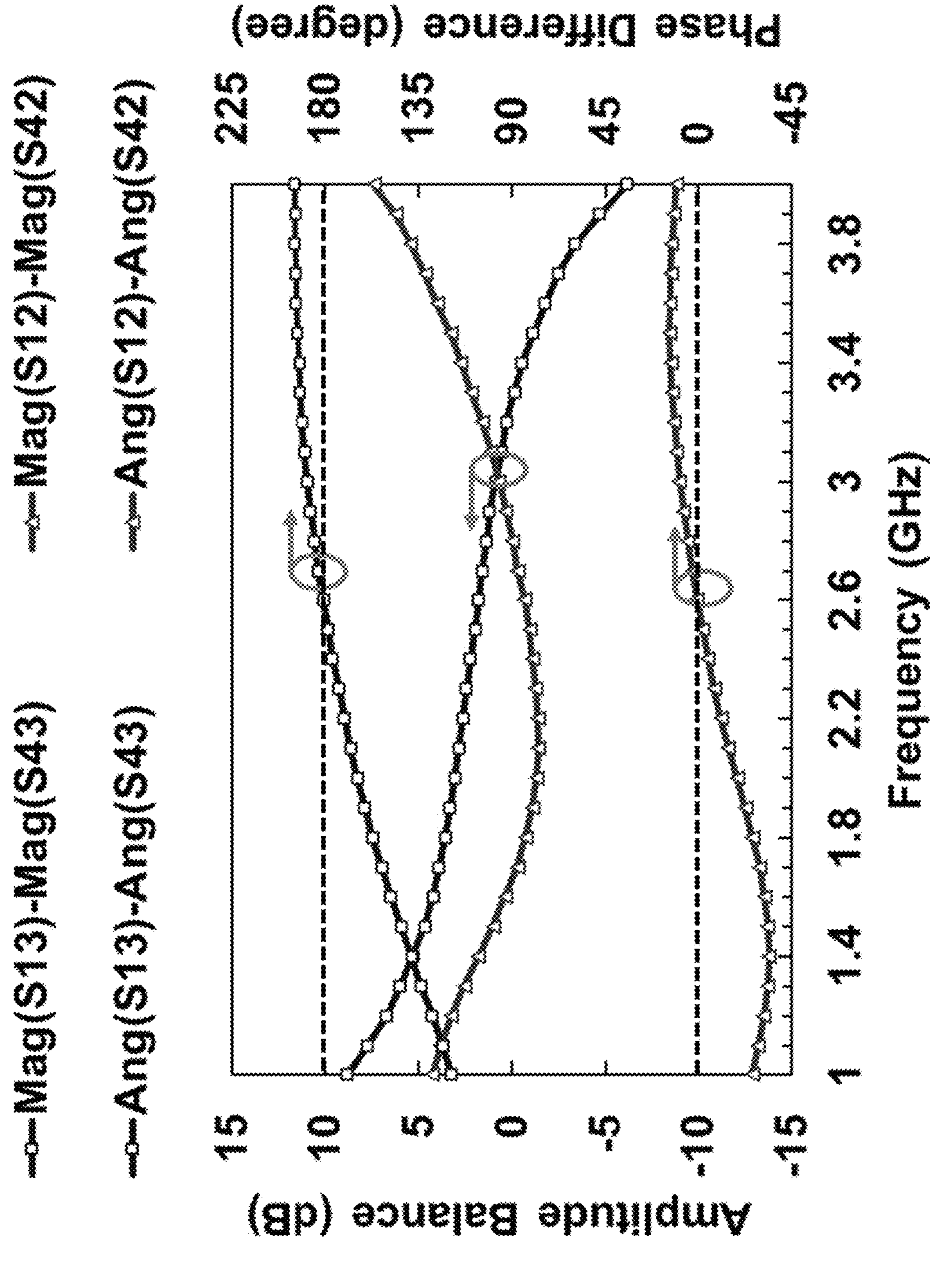
FIG. 11 depicts an exemplary graph showing measured results of amplitude balance and phase difference between port 1 and port 4 with port 2 and port 3 excitation respectively, using the rat-race hybrid enhanced with the microstrip inverter according to an embodiment of the present invention.

FIG. 9 depicts an exemplary graph showing measured results obtained from a four-port test configuration of the rat-race hybrid enhanced with the microstrip phase inverter, in which two ports are excited and the corresponding responses are observed at the remaining ports. The figure presents an exemplary graph showing measured S-parameter responses of a multi-port test configuration across a frequency range from about 1 GHz to 4 GHz. The plotted curves illustrate the variation of transmission and reflection characteristics, providing an indication of the device performance over the operating band. The plotted curves, including S33, S43, S13, S22, S42, and S12, represent representative reflection and transmission characteristics of the device under test, providing an indication of its performance across the operating band. FIG. 10 depicts an exemplary graph showing measured results of return loss and isolation using the rat-race hybrid enhanced with the microstrip inverter according to an embodiment of the present invention. The figure illustrates an exemplary graph showing S-parameter characteristics of a multi-port configuration over a frequency range from about 1 GHz to 4 GHz. The plotted results demonstrate representative transmission and reflection responses, providing an indication of device performance across the operating band. The plotted curves, including S11, S44, S14, and S23, represent representative reflection and transmission characteristics, thereby indicating the performance of the device under test over the operating band. FIG. 11 depicts an exemplary graph showing measured results of amplitude balance in dB and phase difference in degree for a four-port test configuration of the rat-race hybrid enhanced with the microstrip phase inverter. In this measurement, two ports are excited while the corresponding responses are observed at the other two ports, and the plotted data illustrates the resulting balance and phase relationship. The graph shows measured amplitude balance and phase difference in a four-port configuration over a frequency range from about 1 GHz to 4 GHz. The plotted curves, including Mag(S13)-Mag(S43), Mag(S12)-Mag(S42), Ang(S13)-Ang(S43), and Ang(S12)-Ang(S42), demonstrate representative magnitude and phase relationships of the device under test. In this context, "Mag" refers to the magnitude of the scattering parameters expressed in decibels, while "Ang" refers to the angle of the scattering parameters expressed in degrees. The circled markers with horizontal arrows indicate representative frequency points along the curves, highlighting the trend of amplitude and phase balance across the operating band.

In the present disclosure, spatial descriptions, such as "above," "on," "below," "up," "left," "right," "down," "top," "bottom," "vertical," "horizontal," "side," "upper," "over," "under," and so forth, are specified with respect to a certain component or group of components, or a certain plane of a component or group of components, to orient the component(s) as shown in the associated figure. The spatial descriptions used herein are for illustrative purposes only, and practical implementations of the structures described herein can be spatially arranged in any orientation or manner.

As used herein and not otherwise defined, the terms "substantially," "substantial," "approximately" and "about" are used to describe and account for small variations. When used in conjunction with an event or circumstance, the terms can encompass instances in which the event or circumstance occurs precisely as well as instances in which the event or circumstance occurs to a close approximation. For example, when used in conjunction with a numerical value, the terms can encompass a range of variation of less than or equal to ±10% of that numerical value.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A microstrip phase inverter, comprising:

a bottom layer;

a first dielectric layer disposed over the bottom layer;

an insert conductor (IC) layer disposed over the first dielectric layer;

a second dielectric layer disposed over the IC layer;

a top layer disposed over the second dielectric layer and comprising a first strip line and a second strip line which extend along a first direction and across at least one edge of the IC layer and are narrower than the IC layer along a second direction different than the first direction;

at least one first via electrically connecting the bottom layer to the IC layer; and a pair of second vias electrically connecting the IC layer to the first strip line and the second strip line, respectively.

2. The microstrip phase inverter of claim 1, wherein the IC layer comprises a first rectangle portion, a second rectangle portion, and a neck portion located between the first rectangle portion and the second rectangle portion.

3. The microstrip phase inverter of claim 2, wherein the first rectangle portion, the neck portion, and the second rectangle portion are arranged along the first direction in sequence.

4. The microstrip phase inverter of claim 2, wherein a vertical projection of the first strip line on the IC layer overlaps with the first rectangle portion and the neck portion.

5. The microstrip phase inverter of claim 4, wherein a vertical projection of the second strip line on the IC layer overlaps with the second rectangle portion and the neck portion.

6. The microstrip phase inverter of claim 2, wherein the first strip line and the second strip line are spaced apart from each other by a gap directly and vertically located above the neck portion of the IC layer.

7. The microstrip phase inverter of claim 2, wherein each of the first rectangle portion and the second rectangle portion has a length along the first direction in a range from 7 mm to 13 mm.

8. The microstrip phase inverter of claim 7, wherein each of the first rectangle portion and the second rectangle portion has a width along the first direction in a range from 7 mm to 9 mm.

9. The microstrip phase inverter of claim 2, wherein the first rectangle portion and the second rectangle portion are symmetrical about the neck portion.

10. The microstrip phase inverter of claim 2, wherein the first strip line spans across the first rectangle portion, extending from a position directly above the neck portion to a position without vertical overlap with the first rectangle portion.

11. The microstrip phase inverter of claim 10, wherein the second strip line spans across the second rectangle portion, extending from a position directly above the neck portion to a position without vertical overlap with the second rectangle portion.

12. The microstrip phase inverter of claim 2, wherein the first strip line is free from vertically overlapping with the second rectangle portion, and the second strip line is free from vertically overlapping with the first rectangle portion.

13. The microstrip phase inverter of claim 1, wherein the IC layer is at a first height with respect to the bottom layer, the top layer is at a second height with respect to the bottom layer, and a difference between the first height and the second height is between 0.1 mm and 0.3 mm.

14. The microstrip phase inverter of claim 1, wherein the second dielectric layer is thinner than the first dielectric layer.

15. The microstrip phase inverter of claim 1, wherein the first dielectric layer and the second dielectric layer comprise a dielectric material with a dielectric constant in a range from 4 to 4.5.

16. The microstrip phase inverter of claim 1, wherein the microstrip phase inverter has a thickness from the bottom layer to the top layer in a range from 1.1 mm to 1.3 mm.

17. A microstrip phase inverter, comprising:

a bottom layer having a top border and a bottom border opposite the top border which extend along a first direction;

an insert conductor (IC) layer located between the top and bottom borders of the bottom layer in viewing along a normal direction of the bottom layer, wherein the IC layer has a top border and a bottom border opposite the top border which extend along the first direction and a left border and a right border opposite the left border which extend along a second direction different than the first direction;

a top layer located between the top and bottom borders of the IC layer in viewing along the normal direction of the bottom layer and having a first strip line pattern and a second strip line pattern which are separated than each other, wherein the first strip line pattern extends along the first direction and across the left border of the IC layer, and the second strip line pattern extends along the first direction and across the right border of the IC layer, such that the first strip line pattern and the second strip line pattern span from inside to outside of the IC layer.

18. The microstrip phase inverter of claim 17, wherein the IC layer has a pair of first rectangle patterns located both sides of the first strip line, and each of the first rectangle patterns has a length along the first direction in a range from 7 mm to 13 mm.

19. The microstrip phase inverter of claim 17, wherein the IC layer has a pair of second rectangle patterns located both sides of the second strip line, and each of the second rectangle patterns has a length along the first direction in a range from 7 mm to 13 mm.

20. The microstrip phase inverter of claim 17, wherein the IC layer has a width along the first direction in a range from 7 mm to 9 mm.

* * * * *